United States Patent [19]

Clouse, III et al.

[11] Patent Number: 5,608,199
[45] Date of Patent: Mar. 4, 1997

[54] METHOD AND APPARATUS FOR TAGGING OBJECTS IN HARSH ENVIRONMENTS

[75] Inventors: William R. Clouse, III; Robert X. Perez, both of Corpus Christi; Gary E. Heath, Odem, all of Tex.

[73] Assignee: All Tech Inspection, Inc., Corpus Christi, Tex.

[21] Appl. No.: 382,506

[22] Filed: Feb. 2, 1995

[51] Int. Cl.⁶ .................................. G06K 7/00
[52] U.S. Cl. .......................... 235/435; 235/487
[58] Field of Search .................. 235/490, 487, 235/464, 435

[56] References Cited

U.S. PATENT DOCUMENTS

| | | | |
|---|---|---|---|
| 3,916,160 | 10/1975 | Russo et al. | 235/487 |
| 3,959,629 | 5/1976 | Specht et al. | 235/487 |
| 4,202,490 | 5/1980 | Gunkel et al. | 235/449 |
| 4,263,503 | 4/1981 | Bianco | 235/487 |
| 4,280,119 | 7/1981 | May | 235/382 |
| 4,523,088 | 6/1985 | Utsch et al. | 235/487 |
| 4,578,991 | 4/1986 | Nowlin | 73/151 |
| 4,698,631 | 10/1987 | Kelly, Jr. et al. | 340/853 |
| 4,749,847 | 6/1988 | Despres | 235/487 |
| 4,879,457 | 11/1989 | Ludden | 235/487 |
| 4,888,475 | 12/1989 | Mullenmeister | 235/487 |
| 5,168,477 | 12/1992 | Schenato et al. | 367/87 |
| 5,202,680 | 4/1993 | Savage | 340/853.1 |
| 5,268,566 | 12/1993 | Wakaumi et al. | 235/493 |
| 5,270,522 | 12/1993 | Bone, Jr. | 235/375 |
| 5,361,280 | 11/1994 | Omote et al. | 376/248 |
| 5,464,973 | 11/1995 | Despres | 235/494 |
| 5,481,102 | 1/1996 | Hazelrigg, Jr. | 235/487 |

OTHER PUBLICATIONS

San Antonio Express–News May 1, 1994, "Looking for Clues Among the Myths", by Mark McDonald, p. 19–C, published in San Antonio, Texas.

*Primary Examiner*—Donald T. Hajec
*Assistant Examiner*—Mark Tremblay
*Attorney, Agent, or Firm*—Gunn, Lee & Miller, P.C.

[57] ABSTRACT

A Harsh Environment Tag (HET) and associated data collection system are provided that allow the identification, classification, and description of industrial, architectural, and machine equipment within harsh process environments. Each tag consists of a longitudinally arranged array of non-corrosive modules with standardized dimensional variations that are associated with alpha-numerically encoded values. Each tag may be rigidly or loosely affixed to a particular object for the purposes of inventory, inspection, and maintenance. Each tag may be scanned or read or by a transducer configured to detect the specific variations within which the coded information is retained. The coded values are then interpreted by a microprocessor based device capable of associating the coded values with either prerecorded identities and characteristics or with such information as may be input in association with the scan of a particular tag. The system and the tags associated with the system are appropriate for inventory, inspection, and maintenance purposes within industrial, architectural, and machine systems located within harsh environments.

5 Claims, 4 Drawing Sheets

METHOD AND APPARATUS FOR TAGGING OBJECTS IN HARSH ENVIRONMENTS

BACKGROUND OF THE INVENTION

1. Field of the Invention

The present invention relates generally to devices and methods for tagging industrial, architectural, and machine structures and components. The present invention relates more specifically to a method and apparatus for the tagging of industrial, architectural, and machine components within harsh environments and the detection and reading of information contained on the tag.

2. Description of the Related Art

The installation, maintenance and upgrade of industrial, engineering, and architectural fixtures, machines, components and so on, relies to a great extent on accurate inventories and records on each specific element within the systems. Many of the components within industrial and architectural systems have specific life spans and require monitoring and/or replacement at regular intervals. Safety requirements, environmental concerns, and many government regulations require that industries maintain accurate logs on many of the structural and functional components of the physical plants with which the industry operates.

The typical method for maintaining these inventories and records involves the visual inspection of components by an inspector on a periodic basis. These inspections can take the form of simple written logs on pieces of paper that identify specific components and their condition. In order to consistently identify these components, it is typical to tag the devices or objects with descriptive or symbolic codes that can be consistently referred to as repeat inspections are made.

In use today are tags of many different designs; all with limitations in size, shape, and the amount of information contained on the tag. They are attached commonly with rivets, or screws and are made of many different types of materials. Standardization of tag structures of any kind is limited to the very basic information needed for the type of equipment. The life expectancy of these types of tags and the means for attachment are in many cases very limited due to shock, vibration, weather exposure, sandblasting, paint overspray and process hazards.

Commonly, industrial equipment tags used in harsh environments are of two basic types. They are made of sheet metal material and incorporate either raised letters or engraved letters for retaining the identification information. Both types are normally stencilled or electroplated with paint to show generic information descriptive of the type of equipment, with the specific design information engraved or pressed in raised lettering. These types of tags are very common and can be seen on motors, pumps, turbines, pressure vessels, etc.

Still, another type of tag existing today is the bar code tag. This tag is a sticker with bar code information on one side and is attached like tape to a metal tag or directly to the piece of equipment. These types of tags have even a shorter life span than the former types discussed above.

The tags discussed above all hold information such as model, serial number, horsepower, voltage, flow capacity, rpm values, maximum working pressures and temperatures, etc. The information on these tags is vital for on site inspection by operators, maintenance personnel, and inspectors.

Currently tags do not exist that can withstand the harsh environment they are frequently exposed to in the process industry. The information on such tags has become increasingly important because of current process industry regulations. As an example, OSHA 1910.119 and other OSHA regulations relating to inspection and testing, require the testing of process equipment and the documentation of such test results. This will ultimately require being able to identify the piece of equipment through its serial number, and then for proper testing, the limits of the equipment and other pertinent information.

One method developed in recent years utilizes ultrasound echoing techniques for the identification of valuable art and has a unique data encrypted tag. U.S. Pat. No. 4,749,847, issued to Jean-Albert Despres on Jun. 7, 1988, describes a method and device for identifying a valuable object. This method and apparatus is not well suited for the harsh environments of the process industry and would be a very costly design if implemented on a large scale. The cost associated with the cutting of curvalinear notches and its basic design features make it impractical.

The method for reading the tag described in the Depres patent is too time consuming and therefore not cost effective. The ability of a technician to read a tag continuously and rapidly is of paramount importance. It would be desirable to design a tag capable of being read by a transducer in a sweeping motion across its face. In addition, there is a need for an attachment mechanism that will allow longevity, and a cost effective means for manufacture of massive quantities. Inherently, the tag must be equipped to withstand cyclic temperatures, vibrations, shocks, weather, chemical attack, sandblasting, paint overspray, abuse from turnover, light exposure, pressure and so on.

SUMMARY OF THE INVENTION

It is therefore an object of the present invention to provide a system for identifying industrial, architectural and machine components within harsh environments for the purposes of repeated inspections and inventory that retains relevant identification information despite the corrosive effects of the environment.

It is a further object of the present invention to provide a harsh environment tag technology for identifying industrial, architectural and machine components that is easily readable by portable devices carried by inspectors.

It is a further object of the present invention to provide harsh environment tag technology that permits the use of non-corruptible identification and informational tags of a variety of configurations adaptable for attachment to a variety of industrial, architectural and machine components.

It is a further object of the present invention to provide harsh environment tag technology that permits the encoding of at least an identification number into a non-corruptible tag that is easily read by portable equipment without being subject to errors and the necessity of repetitive scanning.

It is a further object of the present invention to provide a harsh environment tag technology system that permits customized tag encodement and customized identification programming such that the same hardware system might be utilized in a multitude of different industrial, architectural or machine environments, each with their own means for identification, inventory and maintenance.

In fulfillment of these and other objectives, the present invention provides a system and method for tagging industrial, architectural and machine components within harsh environments and for rapidly reading such tags for identification, inventory and maintenance purposes. The present system provides a tag configuration comprised of a sequential series of plates of varying thicknesses arranged so as to encode at least identification information in a specific discernable order. The system provides a mechanism for scanning the tag so as to discern the plate thicknesses, to recall a value for each of the thicknesses in conjunction with the order in which they occur, and to associate that value with a particular encoded bit of information.

In a preferred embodiment, the present invention utilizes an ultrasonic thickness transducer for scanning across the tag and recording the variations in plate thicknesses for the arranged set of plates. Microprocessor capabilities of the system recognize and associate the encoded information read from the tag with additional information stored in retrievable memory. The system anticipates that the user might supply additional information about the industrial, architectural or machine component in association with the identified tag information.

The harsh environment tag solves a current problem that plagues the process industry, namely the need for a durable tag capable of long term identification in harsh environments. Such a device is mandated by the industry and regulatory agencies alike. The combination of a tag and data collection system will provide not only equipment information but also a means for documentation and verification of inspections and testing of equipment directly on site.

In the process industry, ultrasonics is regularly used to inspect equipment such as piping and vessels. By using the data collection system, the task of on-stream inspection can be facilitated. The term on-streaming defines piping inspections while the plant is operational. Such inspections are done periodically to measure and trend pipe wall thicknesses to insure pipe serviceability. Using the data collection system, the inspector can locate the correct piping to be on-streamed, and verify and document the location for the inspection record. The data collector could have two modes, one as a thickness measuring device, and the other an identification, verification and documentation device.

DESCRIPTION OF THE PREFERRED EMBODIMENT

Figure 1:
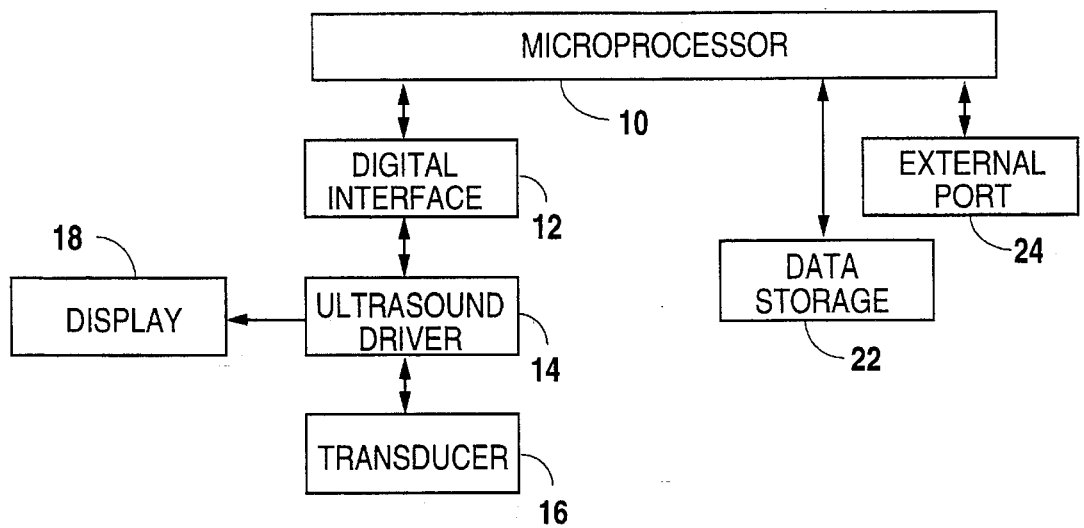
FIG. 1 is a schematic block diagram illustrating the primary electronic components of the system of the present invention.

Reference is first made to FIG. 1 for a general description of the fundamental components of the system of the present invention. Harsh Environment Tag (HET) (30), which is described in more detailed below, may be any of a number of specifically structured devices capable of being read by the system of the present invention. Harsh Environment Tag (30) is scanned by transducer (16), which in the preferred embodiment is an ultrasonic measuring device such as an ultrasonic thickness meter well known in the art. Transducer (16) is driven by ultrasound driver (14) which also serves to communicate a return signal from transducer (16). This return signal may be immediately displayed on display (18) and/or be communicated to microprocessor (10) by way of digital interface (12). The devices and methods associated with the ultrasonic measuring equipment, including transducer (16), driver (14) and display (18) are all well known in the art. Digital interface (12) is simply an A/D converter capable of quantifying a signal level generated through transducer (16) and driver (14) into a digital value recognized and manipulable by microprocessor (10).

Microprocessor (10) is programmed to associate particular signal amplitude and timing characteristics with either encoded information or specific tag scanning functions and steps. Generally, microprocessor (10) is provided with signal information from digital interface (12) in the nature of tag material thickness values that are correlated with specific preprogrammed alpha-numerical values and with tag scanning functional signal characteristics, such as start and stop identifiers and digit interface features. Microprocessor (10) is programmed to receive, interpret and accumulate the digital information provided from digital interface (12).

Microprocessor (10) incorporates pattern recognition circuitry and programming to assist in the interpretation of specific signal amplitude and timing characteristics. This programming includes standard signal amplitude values indicative of an accurately reflected signal and timing values indicative of specific tag thicknesses. As described in more detail below, standard thicknesses for calibration blocks and standard thicknesses for the alphanumerically encoded data are established and programmed into Microprocessor (10). In addition, again as described in more detail below, pattern recognition programming permits the identification of transition zones in the tag between the calibration blocks and the data blocks and between adjacent data blocks.

Microprocessor (10) is further facilitated by data storage (22) for recording information received and for comparing information received to previously recorded identification codes and material characteristics. Finally, microprocessor (10) may be programmed and/or may have data uploaded or downloaded by way of external port (24).

Figure 2:
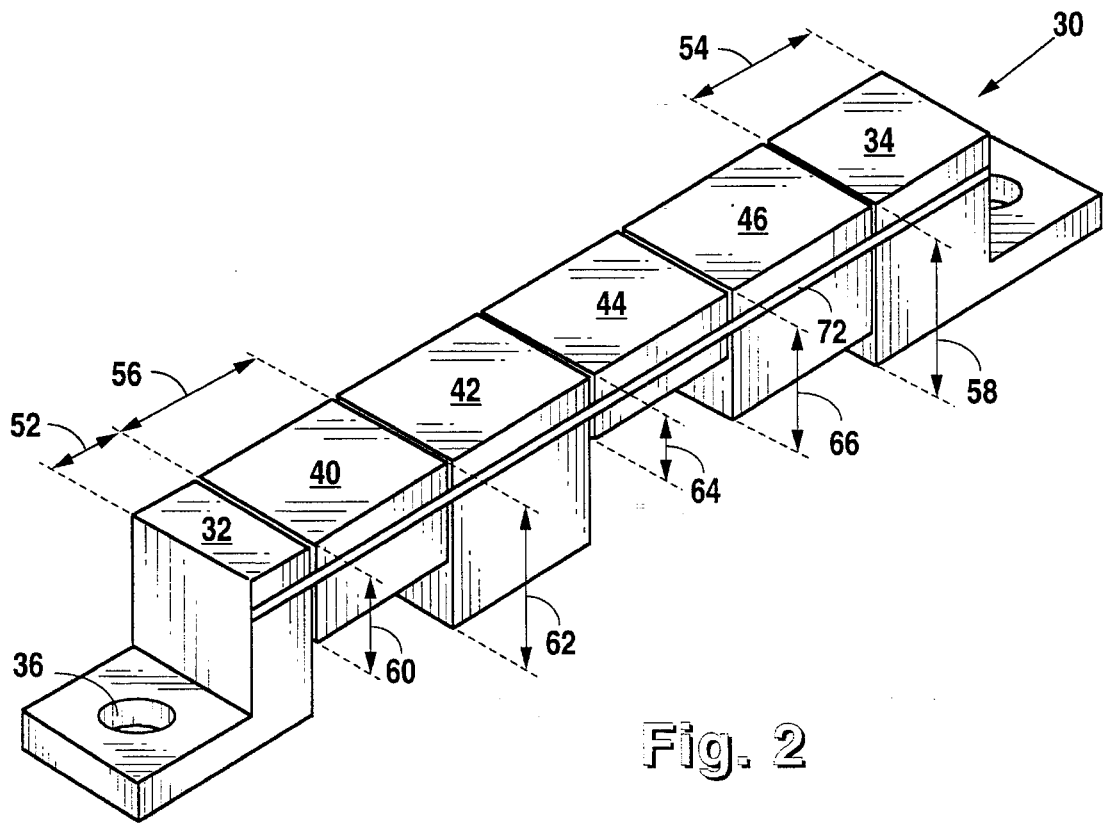
FIG. 2 is perspective view of a Harsh Environment Tag appropriate for use in conjunction with the system of the present invention.

Reference is now made to FIG. 2 for a description of a first example of a Harsh Environment Tag suitable for use within the system of the present invention. FIG. 2 discloses a device generally longer in one dimension than its width and made up of discreet but attached modular elements. Specifically, FIG. 2 discloses Harsh Environment Tag (30) as being an assembly of discreet yet connected metallic blocks and plates. A plurality of plates (40–46) are sandwiched between calibration blocks (32 & 34). Calibration blocks (32 & 34) serve as the means for attaching Harsh Environment Tag (30) to the object it is intended to tag. This attachment is facilitated by means of holes (36).

Plates (40–46) are longitudinally aligned, generally retain a similar surface configuration, but vary in their dimensional depth (60–66). A variety of depth dimensions (60–66) are required, considering the information that the tag is intended to convey to the scanner. Plates (40–46) are designed to convey the fundamental identification information about the object that is being tagged and calibration blocks (32 & 34) are intended to orient the scan when it is made. For this reason, the dimensions (52) and (54) of calibration blocks (32) and (34) are distinct from the dimensions (56) associated with plates (40–46).

As indicated above, the physical surface dimensions projected outward from tag (30) for plates (40–46) are generally the same. The distinctions, as described later, between individual plates (40–46) are to lie in the changes in the depth dimension (60–66). Depth dimension (58) for both calibration blocks (32) and (34) is the same and represents the overall depth of tag (30).

Calibration blocks (32) and (34) accomplish a number of functional objectives. First, they allow a convenient place to calibrate the transducer for the inherent system variance that will occur from tag to tag and environment to environment. Secondly, the two different surface dimensions (52) and (54) represent reference points for the scan. The microprocessor, through the ultrasonic measuring device, will recognize calibration blocks (32) and (34) as reference points and decipher and interpret the balance of the code accordingly. This permits the scan to occur in either direction. This also forces the technician to calibrate the system before reading tag (30) if the correct information is to be obtained. Calibration of the system involves measuring a calibration block of specifically known geometry and composition. With this information stored in Microprocessor (10), the system can effectively zero measurements so as to compensate for temperature effects and variations between different ultrasonic sensors. When the system identifies a calibration block it is programmed to set the time and amplitude reference points on which the actual encoded identification data measurements are based. That is, depth (58) provides a known fixed reference from which the variations in depth for plates (40–46) can be measured, again taking into account changes in the plate geometry and in the speed of signal travel that are brought about by temperature changes and other factors.

In addition, the distinct dimensions (52) and (54) provide a thick and a thinner leg for the tag. This distinction allows for an inherent flexibility in the thinner leg that facilitates the mounting of the tag on a non-planar surface and the ability of the tag to expand and contract in the face of temperature changes.

Plates (40–46) retain depth variations in order to convey identity information in the form of an alpha-numeric code. Specifically, plate (40) retains a depth dimension of (60) which is distinct from depth dimension (62) associated with plate (42), which is in turn distinct from depth dimension (64) associated with plate (44) and so on the entire assembly of Harsh Environment Tag (30) is held together by means of adhesive at the plate interfaces (not shown) or by means of a weld (72) down a length of the tag.

Figure 3:
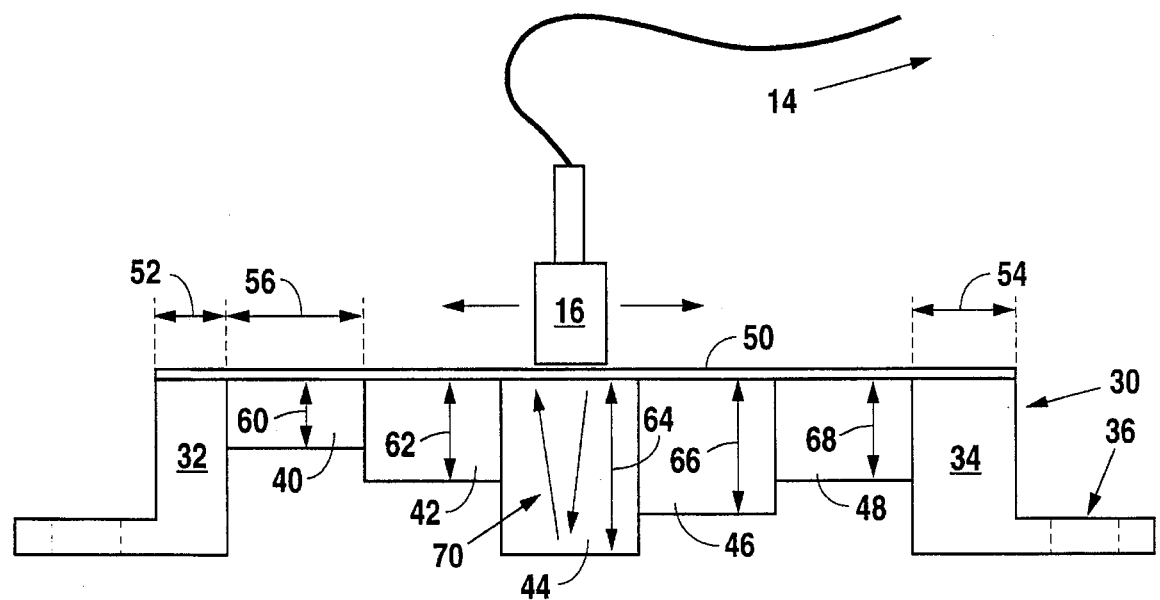
FIG. 3 is an elevational side view of a tag, similar to that shown in FIG. 2, disclosing its use in association with a scanning transducer.

Reference is now made to FIG. 3 for a detailed description of the fundamental scanning feature of the present invention. FIG. 3 discloses, in an elevational side view, a tag structurally similar to that disclosed in FIG. 2. Ultrasonic transducer (16) is shown positioned on or adjacent to tag (30) and is connected to ultrasound driver (14). As indicated above, the scan of tag (30) may be accomplished in either direction down the length of tag (30). Acoustic couplant (50) may be provided to the top surface of tag (30) to facilitate ultrasonic transmissions.

As transducer (16) is scanned across the upper surface of tag (30) its sole purpose is to measure the thicknesses of plates (40–48) and to identify and locate each of calibration blocks (32) and (34). Utilizing a well-known pulse echo method for thickness measurements, ultrasonic transducer (16) may very quickly identify the thickness of a specific plate (40–48) over which it is positioned at a particular moment in time. A transmitted pulse passes through couplant (50) into a block (44) for example, travels the depth dimension (64) for block (44) and is reflected off of the bottom face of block (44) back towards ultrasonic transducer (16). The transmitted and reflected signal (acoustic wave) (70) is shown generally in FIG. 3. Again, as well known in the art, the time associated with the round-trip travel of the acoustic wave (70) is a direct indication of the thickness of plate (44). Ultrasonic transducer (16) is capable of making such measurements for each individual component within tag (30).

Figure 4:
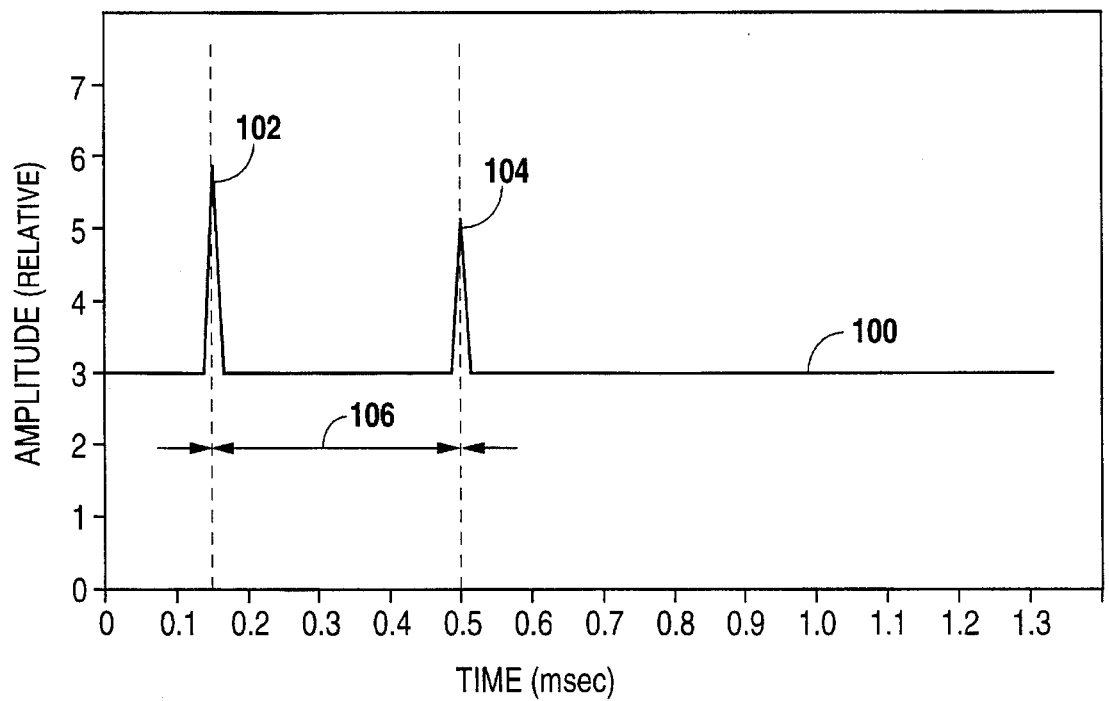
FIG. 4 is a graphic representation of one portion of a signal derived from a scan as described with regard to FIG. 3.

Reference is now made to FIG. 4 for a description of the analog characteristics of the signal return by ultrasonic transducer (16) as, for example, in the case shown in FIG. 3. FIG. 4 plots relative amplitude versus time and shows signal (100) with a first peak in amplitude (102), and a second peak in amplitude (104). The time spacing (106) between peak (102) which is indicative of the initial acoustic pulse transmission, and peak (104), which is indicative of the reception of the echo acoustic wave, represents a measure of the depth dimension for a particular plate of the tag. Again, as is well known, associating time dimension (106) with known acoustic wave velocities permits an accurate representation of the depth dimension under investigation.

Figure 5:
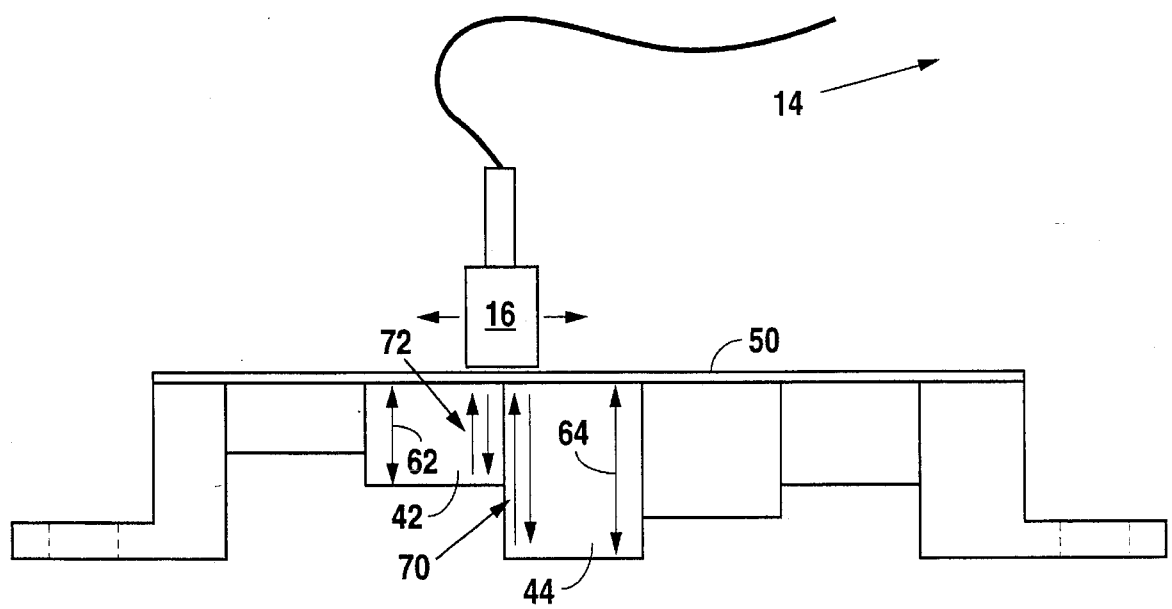
FIG. 5 is an elevational side view of a tag, similar to that shown in FIG. 2 with a transducer positioned to discern the interface areas within the tag.
Figure 6:
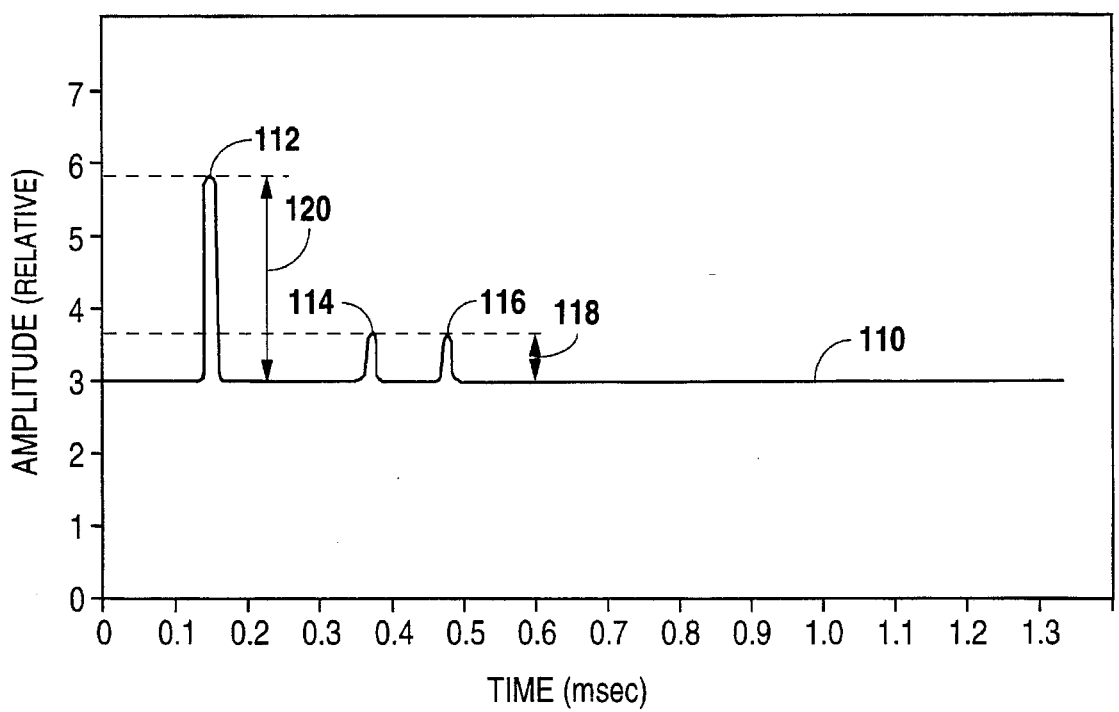
FIG. 6 is a graphic representation of one portion of a signal derived in connection with FIG. 5 showing interface characteristics.

Reference is now made to FIGS. 5 and 6 for a description of an additional, critical, functional concern during the scan of a Harsh Environment Tag device. Because it is desirable that a scan may be accomplished at any rate longitudinally along a tag, it is necessary to provide some mechanism for the system to identify interfaces between individual digits or elements in the alpha-numeric code. As described above, the beginning and end of a scan are handled by the characteristics of calibration blocks (32) and (34) shown in FIGS. 2 and 3. Signal characteristics associated with the interface between discreet plates provides a mechanism for distinguishing between and identifying a transition from one coded digit to the next. As shown in FIG. 5, two separate coded alpha-numeric digits are represented by plates (42) and (44). After measuring a depth dimension (62), for example, for plate (42) by way of ultrasonic wave path (72), a transition environment is experienced at an interface between plate (42) and (44), prior to transducer (16) again measuring a depth dimension (64) associated with plate (44), evidenced by acoustic wave path (70). The signal characteristic experienced at this interface is essentially a dispersion that permits a distinction between a return signal truly indicative of a depth dimension for a particular plate and an interface zone. Reference is made to FIG. 6 for a more thorough explanation of this functional characteristic.

In FIG. 6, relative amplitude is again plotted versus time for a signal return (110). Initial pulse (112) carries a high amplitude (120). A nominal return pulse (not shown) would have an amplitude equal to a significant percentage of amplitude (120). However, at an interface area, two return pulses are received (114) and (116), each with lower amplitudes (118) indicative of the dispersive characteristics of the interface. Return pulses (114) and (116) are spaced in time, again according to differences in the depths that they measure.

As long as the dispersive characteristics of the interface are sufficient to provide amplitude differences, between amplitude (118) and amplitude (120) for example, that are distinguishable by the system of the present invention, interfaces and thus transitions from one encoded value to the next can be identified. The microprocessor of the present system need only be programmed to detect threshold amplitude variations to determine and identify these transitional characteristics.

Figure 7:
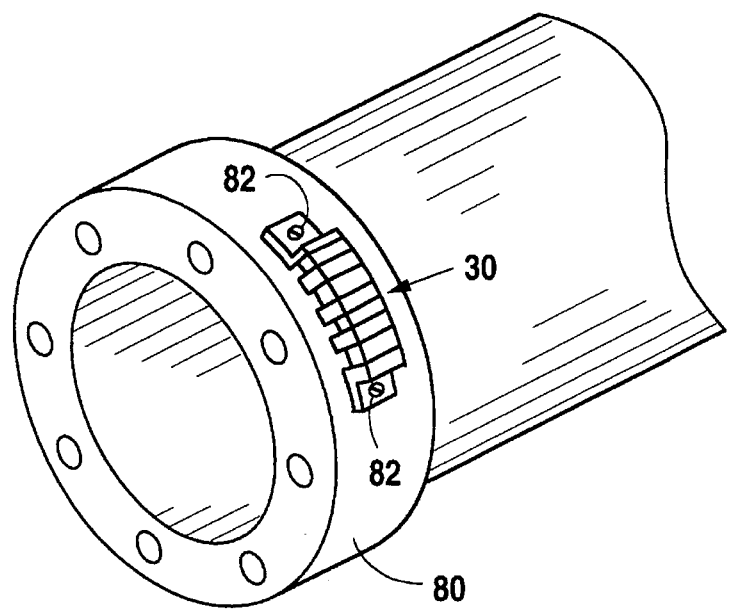
FIG. 7 is a perspective view of one means for attachment of the Harsh Environment Tag of the present invention to a cylindrical pipe structure.
Figure 8:
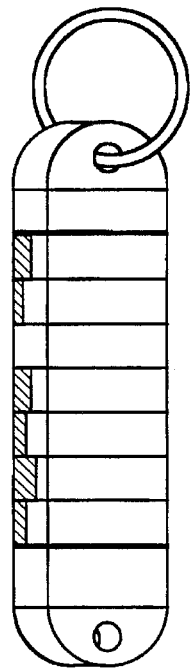
FIG. 8 is a perspective view of a second possible means for attachment of the Harsh Environment Tag of the present invention.

Reference is now made to FIGS. 7 and 8 for two examples of the physical attachment of tags appropriate for use in conjunction with the present invention on industrial, architectural or machine objects. In FIG. 7, a typical rigid attachment of tag (30) to a cylindrical pipe structure (80) is accomplished by means of screws, bolts, or rivets (82). As described above, the structure of tag (30) facilitates its attachment to a non-planar surface.

FIG. 8 discloses a sample structural configuration for tag (30) that permits the loose attachment of tag (30) to a variety of variously configured industrial, architectural, and machine objects. FIG. 8 reflects a structural configuration similar to the paper and embossed tags now quite common in the industry, and provides an easy mechanism for the replacement of these degradable tags.

In any event, the tags associated with the present invention are attached to and/or are positioned on industrial, architectural, and machine objects in locations that permit easy access by an investigator, inventory or inspection personnel. In a preferred embodiment, the inspection or inventory personnel would retain a portable ultrasonic scanning unit which may or may not comprise a display as described in FIG. 1, but would comprise the microprocessor and associated circuitry for the identification, interpretation and storage of the tag information. In the preferred embodiment, the portable unit carried by the inspector or technician also provides a mechanism, whereby additional information could be input and stored in a manner that associates that information with a particular object having been scanned by the system of the present invention. The present invention is, therefore, anticipated to be ancillary to and accompany a mechanism for physical maintenance characteristics to be identified and recorded at the time of inspection. A specific example of such a use of the present invention could involve the combined application of the ultrasonic device to a means for reading or scanning the Harsh Environment Tag and a means for measuring pipe conduit or plate thicknesses undergoing deterioration. In other words, as an example, an inspector could approach a pipe fitting, utilize the ultrasonic device to scan the Harsh Environment Tag, thereby identifying the fitting, and then scan the wall structure of the fitting with the same ultrasonic device and record any anomalous wall thicknesses associated with the identification number. It is anticipated, however, that other physical characteristics of the objects being inspected or inventoried could be visually discerned and manually input through an alpha-numeric key pad or the like.

On the other hand, the use of the system of the present invention could be as simple as a mechanism for creating an inventory list of industrial, architectural and machine components. It is anticipated that in many cases no additional information other than the identity of particular components would be desirable during an inspection or inventory ran. The present invention is also capable of operating with a system involving a priori knowledge of the components within the environment of concern or without such knowledge. The system is envisioned as being operable in connection with an existing inventoried environment where individual components are identified within the microprocessor of the system by specific serial number-type identities. For example, a particular flange located at a particular point in a manufacturing plant would be previously identified by a specific alpha-numeric code, such as FL4952. Previously programmed indexing would associate this serial number identification with particular structural characteristics and object installation data, lifetime data, and operating environment conditions data. When, for example, particular components within an industrial manufacturing environment require replacement on a periodic basis, the present invention provides an easy means for identifying and logging the installed time periods for each of a large number of industrial components.

It is also anticipated that the system of the present invention could be utilized in conjunction with maintenance records whereby a preprogrammed inventory is included in the microprocessor of the present invention and the operator is prompted on a display to locate and examine specific objects.

In any event, the primary objective of the present invention is to provide a means for tagging objects for environments within which it would otherwise be difficult to tag. The present invention provides a tag structure and configuration resistant to harsh chemicals, gases, temperatures, and pressures in a manner that retains encoded information on a tag for an extended period of time. The present invention also provides this capability with an ease of operation as good or better than the visually inspected tags previously utilized.

It is anticipated that transducer devices based on other than ultrasonic transmissions could be utilized. Many well known mechanical wave and electromagnetic wave and field transmitter/sensors could be utilized. In addition, it is anticipated that the tag structural characteristic that encodes the identification information might be something other than plate depth. Structural characteristics such as density, plate width, geometry, ferromagnetic composition, lamination layers, and other non-corruptible characteristics, could be used.

We claim:

1. A system for tagging and subsequently identifying components of industrial, architectural, and machine systems located within harsh environments, comprising:

at least one harsh environment tag, said tag comprising a plurality of like structured code elements arranged linearly and adjacent one another, said linear arrangement of code elements providing a generally flat upper surface for said tag, each of said elements having a distinct depth dimension directed perpendicular to said linear arrangement, said depth dimensions being non-corruptible within said harsh environment, said distinct depth dimensions each being associated with previously assigned bits of information which when taken together serve to identify said tagged component, said tag further comprising at least one terminal calibration element positioned in association with, and at one end of, said linear arrangement of code elements, said terminal calibration element providing a means for identifying a terminal point on said tag, establishing an order orientation for said code elements, and having a fixed and known value for said depth dimension, said fixed value providing a reference point from which values for said structural depth variations of said code elements may be determined;

a transducer capable of detecting and quantifying said depth dimensions for each of said code and calibration elements of said harsh environment tag and generating a signal representative of said dimensions, said transducer further capable of detecting an interface zone between each of said code and calibration elements and generating a signal indicative thereof; and a microprocessor for receiving and interpreting said signals from said transducer for each of said code and calibration elements and each of said interface zones of said tag and associating said information with predefined alphanumeric coding, said alphanumeric coding being representative of information about said components to which said tag is attached.

2. The system of claim 1 wherein said transducer comprises an ultrasonic sensor capable of generating an output ultrasonic wave and receiving a reflected ultrasonic wave.

3. A method for tagging and subsequently identifying components of industrial, architectural, and machine systems located within harsh environments, comprising the steps of:

tagging components of said industrial, architectural, and machine systems with at least one harsh environment tag, said tag comprising a plurality of like structured code elements arranged linearly and adjacent one another, said linear arrangement of code elements providing a generally flat upper surface for said tag, each of said elements having a distinct depth dimension directed perpendicular to said linear arrangement, said depth dimensions being non-corruptible within said harsh environment, said distinct depth dimensions each being associated with previously assigned bits of information which when taken together serve to identify said tagged component, said tag further comprising at least one terminal calibration element positioned in association with, and at one end of, said linear arrangement of code elements, said terminal calibration element providing a means for identifying a terminal point on said tag, establishing an order orientation for said code elements, and having a fixed and known value for said depth dimension, said fixed value providing a reference point from which values for said structural depth variations of said code elements may be determined;

detecting and quantifying said depth dimensions for each of said code and calibration elements of said harsh environment tag with a transducer, and generating a signal representative of said;

detecting an interface zone between each of said code and calibration elements, and generating a signal indicative thereof; and receiving and interpreting said signals, from said transducer for each of said code and calibration elements and each of said interface zones of said tag and associating said information with predefined alphanumeric coding, said alphanumeric coding being representative of information about said components to which said tag is attached.

4. The method of claim 3 wherein said transducer comprises an ultrasonic sensor and said step of detecting and quantifying said depth dimensions comprises generating an output ultrasonic wave and receiving a reflected ultrasonic wave and measuring a time difference between said output and said reflected waves.

5. The method of claim 3 wherein said step of receiving and interpreting said signal includes comparing said signal to said reference point as a means for correcting said signal for errors created by variations in temperature and tag environmental factors.

* * * * *